US009321481B2

United States Patent
Kauffman et al.

(10) Patent No.: US 9,321,481 B2
(45) Date of Patent: Apr. 26, 2016

(54) SYSTEM FOR PROVIDING STEERING ASSIST TORQUE BASED ON A LATERAL POSITION COMMAND

(71) Applicants: Timothy W. Kauffman, Frankenmuth, MI (US); Scott A. Millsap, Grand Blanc, MI (US); Farhad Bolourchi, Novi, MI (US)

(72) Inventors: Timothy W. Kauffman, Frankenmuth, MI (US); Scott A. Millsap, Grand Blanc, MI (US); Farhad Bolourchi, Novi, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 215 days.

(21) Appl. No.: 13/783,433

(22) Filed: Mar. 4, 2013

(65) Prior Publication Data
US 2014/0046542 A1    Feb. 13, 2014

Related U.S. Application Data

(63) Continuation-in-part of application No. 13/570,336, filed on Aug. 9, 2012.

(51) Int. Cl.
*B62D 1/28* (2006.01)
*B62D 6/00* (2006.01)
*B62D 15/02* (2006.01)

(52) U.S. Cl.
CPC ........ *B62D 6/001* (2013.01); *B62D 1/28* (2013.01); *B62D 15/025* (2013.01)

(58) Field of Classification Search
None
See application file for complete search history.

(56) References Cited

U.S. PATENT DOCUMENTS

| | | | |
|---|---|---|---|
| 5,488,555 A * | 1/1996 | Asgari et al. | 701/41 |
| 5,765,116 A * | 6/1998 | Wilson-Jones et al. | 701/41 |
| 6,301,534 B1 * | 10/2001 | McDermott et al. | 701/41 |
| 8,055,409 B2 * | 11/2011 | Tsuchiya | 701/41 |
| 2005/0197746 A1 * | 9/2005 | Pelchen et al. | 701/1 |
| 2006/0224287 A1 | 10/2006 | Izawa et al. | |
| 2012/0215377 A1 * | 8/2012 | Takemura et al. | 701/1 |
| 2013/0218396 A1 * | 8/2013 | Moshchuk et al. | 701/25 |
| 2014/0046542 A1 * | 2/2014 | Kauffman et al. | 701/41 |
| 2014/0046547 A1 * | 2/2014 | Kaufmann et al. | 701/42 |

* cited by examiner

*Primary Examiner* — Redhwan K Mawari
*Assistant Examiner* — Edward Torchinsky
(74) *Attorney, Agent, or Firm* — Cantor Colburn LLP (57) ABSTRACT

A steering system providing an assist torque to a handwheel is provided, and includes a lateral position module and a torque command module. The lateral position module determines a lateral position command based on a curvature of a lane and a near field heading angle. The torque command module determines the torque assist based on the lateral position command.

19 Claims, 5 Drawing Sheets

SYSTEM FOR PROVIDING STEERING ASSIST TORQUE BASED ON A LATERAL POSITION COMMAND

CROSS-REFERENCES TO RELATED APPLICATIONS

This patent application is a continuation-in-part of U.S. patent application Ser. No. 13/570,336 filed on Aug. 9, 2012, which is incorporated herein by reference in its entirety.

FIELD OF THE INVENTION

The present invention relates to a system for providing a steering assist torque, and in particular to a system for providing a steering assist torque based on a lateral position command.

BACKGROUND OF THE INVENTION

A lane keeping system detects lane markers on the left and right side of the road, and provides an assist torque to a handwheel of a steering system to help keep a vehicle between the lane markers. The lane keeping system may also provide alerts to the driver using visual or audio aids such as, for example, a display, a voice indicator, or chimes. Some lane keeping systems use a lateral position of the vehicle for controlling functions such as the torque assist. The lateral acceleration may also be used during autonomous mode of the lane keeping system.

When the lane keeping system is in autonomous mode, the amount of torque assist that is provided to the handwheel by the lane keeping system may sometimes create more handwheel movement than what a driver typically creates to drive the vehicle. This in turn may create variations in the lateral acceleration of the vehicle, which may be objectionable to the vehicle occupants. However, it should also be noted that sometimes the extra handwheel movement may keep a driver engaged in the driving process, without actually manipulating the handwheel.

SUMMARY OF THE INVENTION

According to one embodiment, a steering system providing an assist torque to a handwheel is provided, and includes a lateral position module and a torque command module. The lateral position module determines a lateral position command based on a curvature of a lane and a near field heading angle. The torque command module determines the torque assist based on the lateral position command.

In another embodiment, a method of determining an assist torque to a handwheel is provided. The method includes receiving a curvature of a lane and a near field heading angle by a lateral position module. The method includes determining a lateral position command based on the curvature and the near field heading angle by the lateral position module. The method includes determining the torque assist based on the lateral position command by a torque command module.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
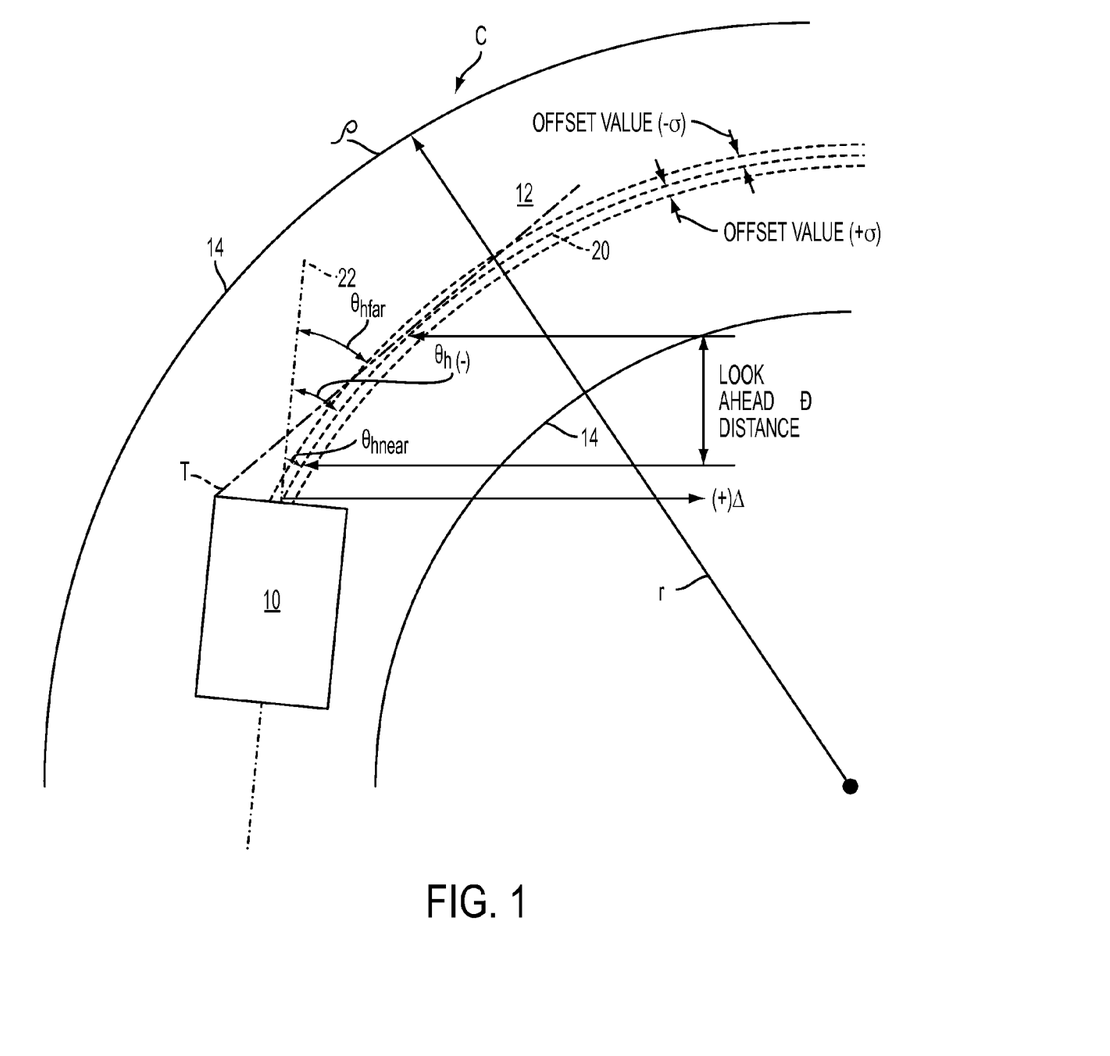
FIG. 1 is a diagram depicting a vehicle in a lane with lane markers in accordance with one aspect of the invention.

Referring now to FIG. 1, where the invention will be described with reference to specific embodiments without limiting same, an exemplary schematic diagram of a vehicle 10 driving within a lane 12 is illustrated. The lane 12 includes lane markers 14 on the left and right hand sides of the lane 12. The lane 12 includes a lane center 20 (the lane center is a calculated value, as there is no lane marker for the lane center 20) and the vehicle 10 includes a vehicle centerline 22. A heading angle θ (not shown in FIG. 1) is measured between the lane center 20 and the vehicle centerline 22, where a positive sign for the heading angle θ (e.g., θ+) is provided if the vehicle centerline 22 is to the right of the lane center 20, and a negative sign (e.g., θ−) for the heading angle θ is provided if the vehicle centerline 22 is to the left of the lane center 20. A lateral position Δ of the vehicle 10 is also illustrated in FIG. 1, where the lateral position Δ includes a positive sign if the vehicle centerline 22 is to the right of the lane center 20, and a negative sign if the vehicle centerline 22 is to the left of the lane center 20. In the embodiment as shown in FIG. 1, the lane 12 also includes a curvature ρ. In the embodiment as shown, the curvature ρ is positive, as the curvature ρ is oriented to the right side of the lane 12. If the curvature ρ is oriented to the left side of the lane 14, then the curvature ρ includes a negative sign.

FIG. 1 also illustrates a near field heading angle $\theta_{hnear}$ and a far field heading angle $\theta_{hfar}$. The near field heading angle $\theta_{hnear}$ is observed relatively close to the vehicle 10 (e.g., generally within about 40 meters of the vehicle 10). The lateral position Δ is also observed relatively close to the vehicle 10 as well (e.g., generally within about 40 meters of the vehicle 10). The near field heading angle $\theta_{hnear}$, the far heading angle $\theta_{hfar}$, and the lateral position Δ are then projected directly in front of the vehicle 10 (e.g., at zero meters). The curvature ρ of the lane 12 is generally calculated as an average value over a distance (where the distance is usually between about 5 to about 25 meters in front of the vehicle 10). The far field heading angle $\theta_{hfar}$ is located in an area labeled as a look ahead distance D. The look ahead distance D is generally in the range of between about 35 to about 70 meters. The far field heading angle $\theta_{hfar}$ is determined by calculating a tangent line T of the lane center 20 at the look ahead distance D. The far field heading angle $\theta_{hfar}$ is measured between the vehicle centerline 22 and the tangent line T at the look ahead distance D.

Figure 2:
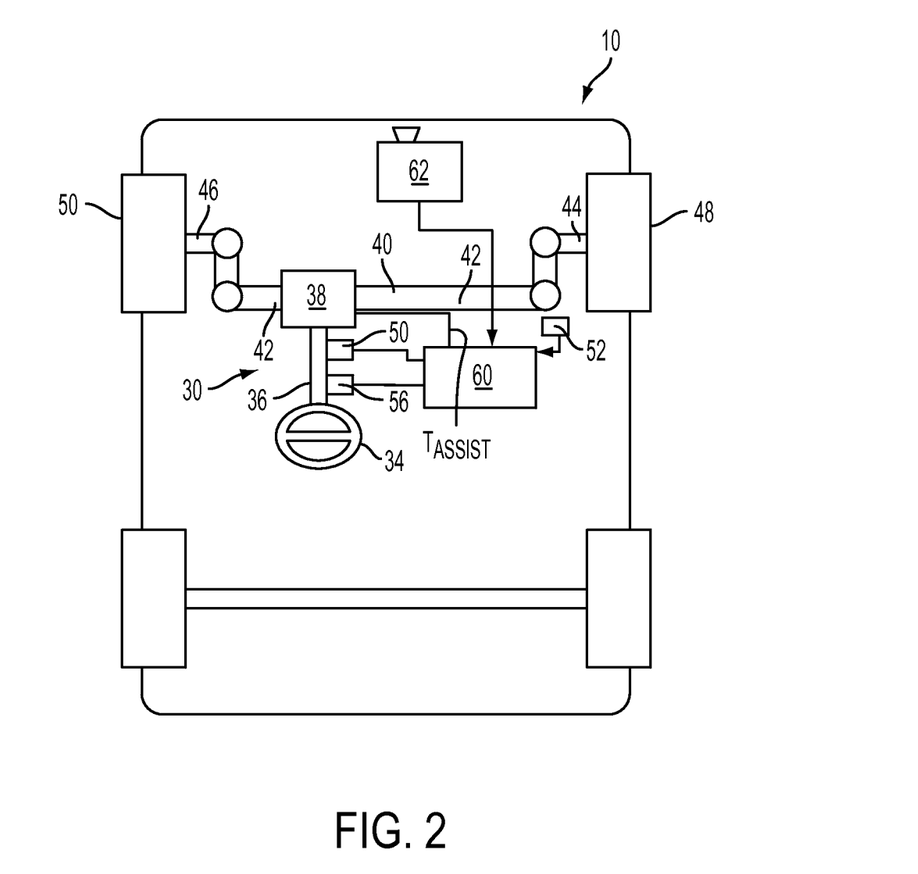
FIG. 2 is a schematic diagram of the vehicle in FIG. 1 having an exemplary system for providing a steering assist torque to a handwheel according to another aspect of the invention.

Turning now to FIG. 2, the vehicle 10 includes a steering system 30. The steering system 30 includes a handwheel 34 coupled to a steering shaft 36. The steering system 30 is an electric power steering (EPS) system that further includes a steering assist unit 38 that couples to the steering shaft 36 of the steering system 30 and to tie rods 40, 42 of the vehicle 10. The steering assist unit 38 includes, for example, a rack and pinion steering mechanism (not shown) that may be coupled through the steering shaft 36 to a steering actuator motor and gearing. During operation, as the handwheel 34 is turned by a vehicle operator, the motor of the steering assist unit 38 provides the assistance to move the tie rods 40, 42 which in turn moves steering knuckles 44, 46, respectively, coupled to roadway wheels 48, 50, respectively of the vehicle 10.

As shown in FIG. 2, the vehicle 10 further includes various sensors that detect and measure observable conditions of the steering system 30 and/or of the vehicle 10. In one example, a torque sensor 50, a vehicle speed sensor 52, and a steering angle sensor 56 are provided. A steering control module 60 controls the operation of the steering system 30 and the steering assist unit 38 based on one or more of the signals from the sensors 50, 52 and 56 and a lane keeping system that are included in the vehicle 10, and determines an torque assist command $T_{assist}$. In various embodiments, the steering control module 60 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

In the exemplary embodiment as shown in FIG. 2, an integrated camera and processor 62 are illustrated. Of course in other embodiments, the camera and processor 62 may be separate components. In one embodiment, the camera and processor 62 may be part of the lane keeping system. The lane keeping system generates feedback for a corrective input into the handwheel 34 in the event a path deviation with respect to the lane markers 14 (shown in FIG. 1) is detected. The camera and processor 62 may calculate the lateral position Δ, the near field heading angle $\theta_{hnear}$, the far field heading angle $\theta_{hfar}$, and the curvature ρ based on the lane markers 14 that are detected by the camera. Specifically, the camera detects the presence of the lane markers 14, and the processor includes control logic for determining the lateral position Δ, the near field heading angle $\theta_{hnear}$, the far field heading angle $\theta_{hfar}$, and the curvature ρ based on the lane markers 14 that are detected by the camera. The camera and processor 62 is in communication with the steering control module 60.

Figure 3:
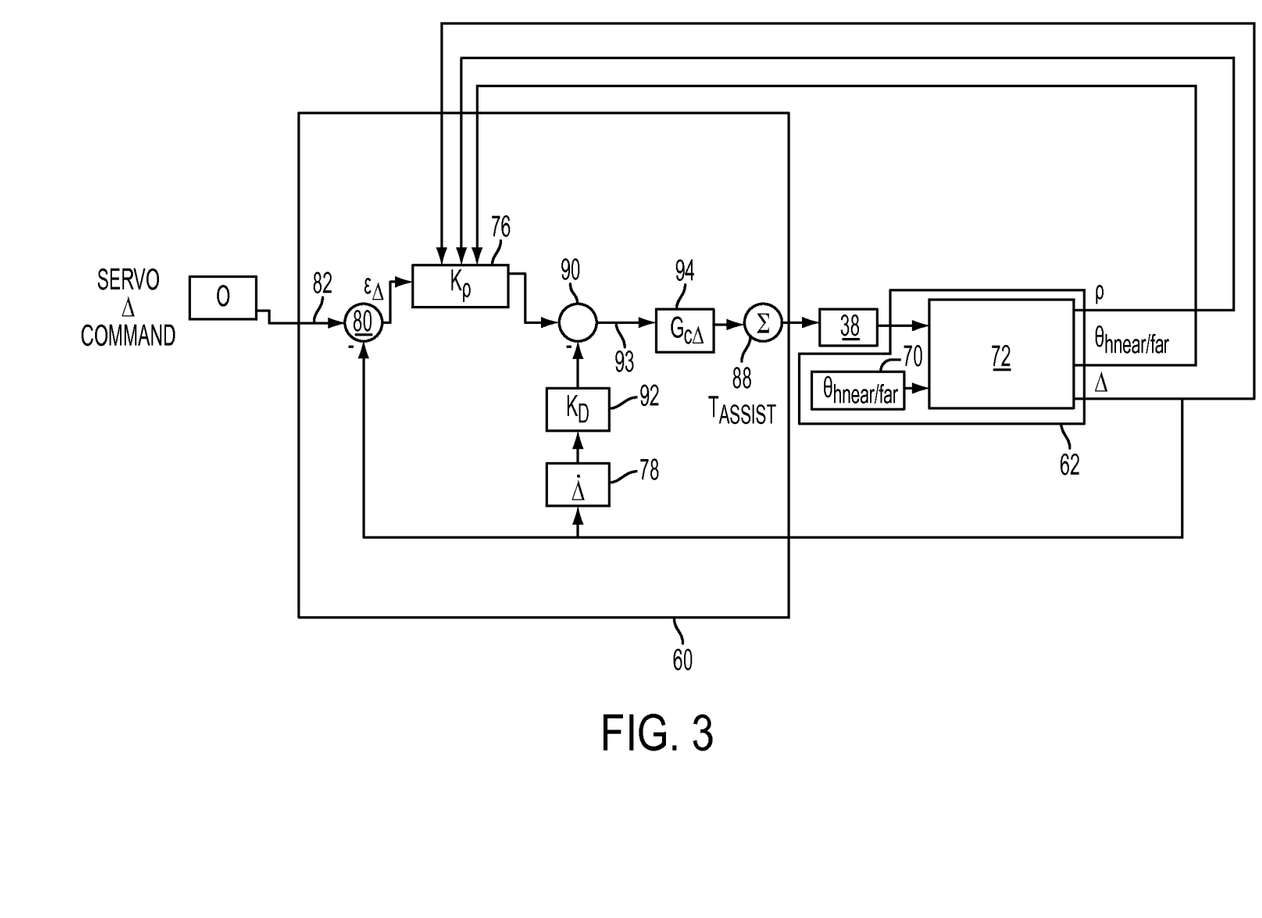
FIG. 3 is a block diagram illustrating a steering control module and a lane keeping system shown in FIG. 2 according to yet another aspect of the invention.

FIG. 3 is an exemplary block diagram of the steering control module 60 and the camera and processor 62. In the embodiment as shown, the camera and processor 62 may include image processing blocks 72 and 72 (in one embodiment, block 72 may be sent from block 70). Image processing block 70 includes control logic for determining the near field heading angle $\theta_{hnear}$ and the far field heading angle $\theta_{hfar}$ based on the lane markers 14 that are detected by the camera. The image processing block 70 is in communication with the image processing block 72. Image processing block 72 determines the lateral position Δ and the curvature ρ based on the lane markers 14 that are detected by the camera. The image processing block 72 is in communication with a proportional gain module 76, a lateral position derivative block 78, and a junction 80, which are each part of the steering control module 60.

The junction 80 receives as input a servo lateral position command 82 and the lateral position Δ as calculated by the image processing block 72. The junction 80 determines the difference between the servo lateral position command 82 and the lateral position Δ to determine a lateral position error $\epsilon_A$. The lateral position error $\epsilon_A$ is sent to the proportional gain module 76 to calculate a proportional gain $K_P$. The proportional gain $K_P$ is scheduled as a function of lateral position error $\epsilon_A$ as well as at least one of the near field heading angle $\theta_{hnear}$, the far field heading angle $\theta_{hfar}$, the curvature ρ, and the lateral position Δ.

The torque assist command $T_{assist}$ (which is an output of the summing junction 88) is based on the proportional gain $K_P$. Specifically, the amount or magnitude of the torque assist command $T_{assist}$, as well as the sign or direction of the torque assist command $T_{assist}$ may be modified based on the proportional gain $K_P$. That is, the torque assist command $T_{assist}$ depends on the sign of the lateral position error $\epsilon_A$ (the sign may be positive or negative), the sign of the far field heading angle $\theta_{hfar}$, and the sign of the curvature ρ of the lane 12 (shown in FIG. 1). Table 1 illustrates one example of how the torque assist command $T_{assist}$ may be modified based on the proportional gain $K_P$.

TABLE 1

| $\epsilon_\Delta$ | $\Theta_{hfar}$ Far Field | Curvature (ρ) | Torque assist command $T_{assist}$ |
|---|---|---|---|
| + | + | + | ↓↓ (large negative command) |
| + | + | − | ↓↓ (Large negative command) |
| − | − | + | ↑↑ (Large Positive command) |
| + | − | + | ↑ (moderate Positive command) |

Note:
negative torque would be steer to the left, positive steer to right.

For example, Table 1 illustrates that if the lateral position error $\epsilon_A$, the sign of the far field heading angle $\theta_{hfar}$, and the sign of the curvature ρ are all positive, then the torque assist command $T_{assist}$ is a relatively large negative command (e.g., between about −3 Nm to about −7 Nm). If the lateral position error $\epsilon_A$ and the sign of the far field heading angle $\theta_{hfar}$ are positive and if the curvature ρ is negative, then the torque assist command $T_{assist}$ is a relatively large negative command (e.g., between about −3 Nm to about −7 Nm). If the lateral position error $\epsilon_A$ and the sign of the far field heading angle $\theta_{hfar}$ are negative and if the curvature ρ is positive, then the torque assist command $T_{assist}$ is a relatively large positive command (e.g., between about 3 Nm to about 7 Nm). If the lateral position error $\epsilon_A$ and the curvature ρ are positive and the far field heading angle $\theta_{hfar}$ is negative, then the torque assist command $T_{assist}$ is a relatively moderate positive command (e.g., between about 1 Nm to about 5 Nm).

The proportional gain $K_P$ is sent to a junction 90. Junction 90 is also in communication with a derivative gain block 92. In one embodiment, the lateral position Δ as calculated by the image processing block 72 is sent to the lateral position derivative block 78. The lateral position derivative block 78 determines the derivative of the lateral position (e.g., the lateral velocity), which is denoted as $\dot{\Delta}$. The derivative of the lateral position $\dot{\Delta}$ may be sent though a low-pass filter (not illustrated), and to the derivative gain block 92. A derivative gain value $K_D$ is multiplied by the derivative of the lateral position $\dot{\Delta}$.

The product of the derivative gain value $K_D$ and the lateral position $\dot{\Delta}$ is sent to the junction 90. The product of the derivative gain value $K_D$ and the lateral position $\dot{\Delta}$ is subtracted from the proportional gain $K_P$ to determine a value 93. The product of the derivative gain value $K_D$ and the lateral position $\dot{\Delta}$ represents a damped value that is provided. That is, the product of the derivative gain value $K_D$ and the lateral position $\dot{\Delta}$ is subtracted from the proportional gain $K_P$, which in turn provides damping to the steering system 30 (shown in FIG. 2). Subtracting the product of the derivative gain value $K_D$ and the lateral position $\dot{\Delta}$ from the proportional gain $K_P$ will in turn reduce the amount of handwheel activity (e.g., turning of the handwheel 34 shown in FIG. 2) if the lane keeping system is operating in an autonomous mode.

The value 93 is multiplied by a lateral position gain $G_{cA}$, at block 94. The lateral position gain $G_{cA}$ is the gain or compensation to insure stability that operates on the lateral position error $\epsilon_A$, the lateral position derivative block 78, and the derivative gain block 92. The product of the lateral position gain $G_{cA}$ and the value 93 are sent to the junction 88, which produces the torque assist command $T_{assist}$. The torque assist command $T_{assist}$ is based on the proportional gain $K_P$, as well as the product of the derivative gain value $K_D$ and the lateral position $\dot{\Delta}$, which is a damped value. Some other steering systems currently available schedule the proportional gain based on only the lateral position error $\epsilon_A$. In contrast, the steering system 30 of the present disclosure schedules the proportional gain $K_P$ on the lateral position error $\epsilon_A$ as well as at least one of the near field heading angle $\theta_{hnear}$, the far field heading angle $\theta_{hfar}$, the curvature $\rho$, and the lateral position $\Delta$. This in turn will modify or improve the accuracy of the torque assist command $T_{assist}$, as the proportional gain $K_P$ is now based on various characteristics of the lane 12 (shown in FIG. 1). This in turn results in reduced handwheel activity in the event the lane keeping system is operating in the autonomous mode.

Figure 4:
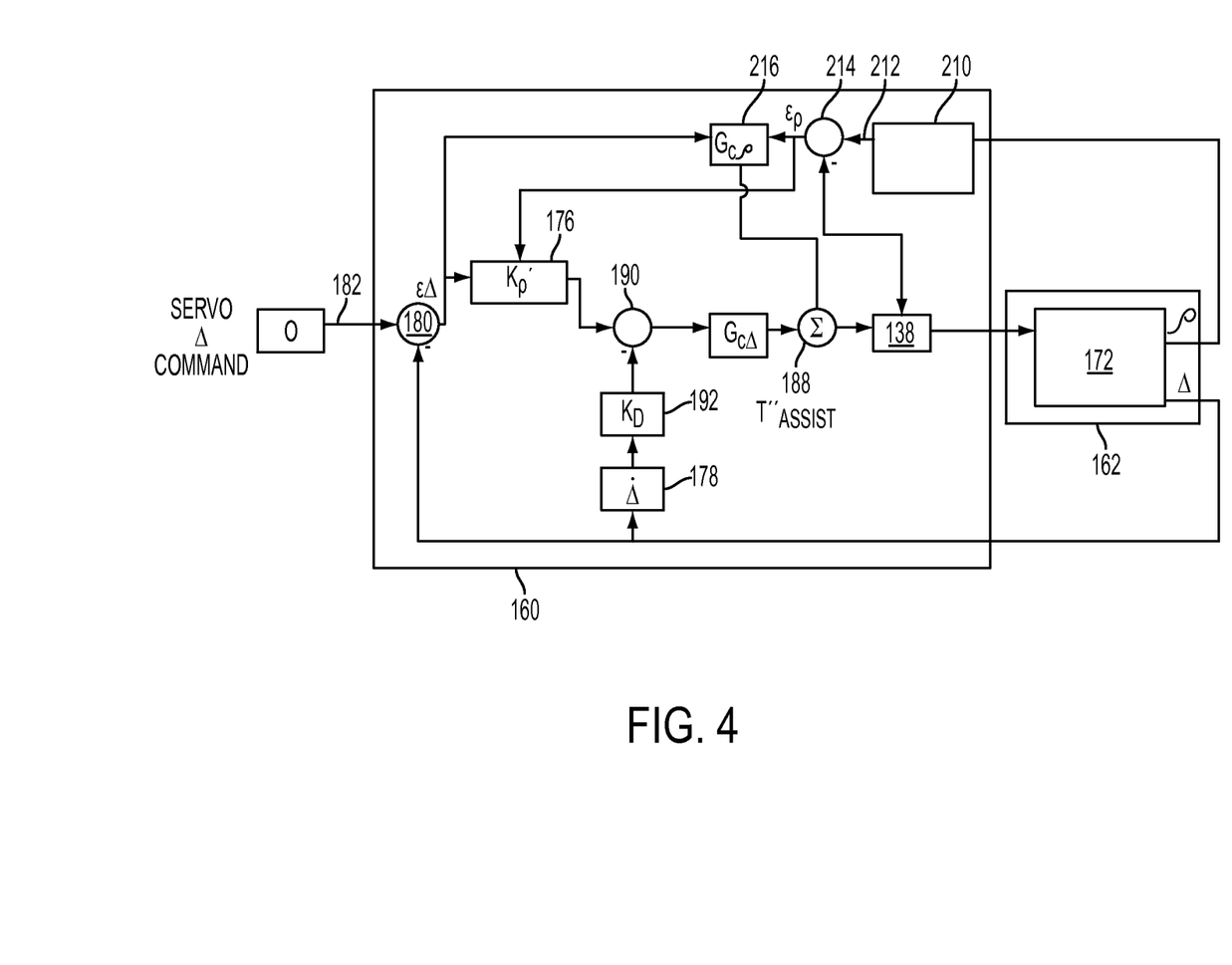
FIG. 4 is an alternative embodiment of the block diagram shown in FIG. 3 illustrating another aspect of the invention.

FIG. 4 is an alternative embodiment of an exemplary block diagram of a steering control module 160 and a camera and processor 162 that are also used to calculate a torque assist command $T'_{assist}$. In the embodiment as shown, the camera and processor 162 may include image processing block 172. In the embodiment of FIG. 4, the steering control module 160 calculates a handwheel angle of the handwheel 34 (shown in FIG. 2) based on the curvature $\rho$ of the lane 12 (shown in FIG. 1). The curvature of the lane 12 is based on the lane markers 14 that are detected by the camera.

The curvature $\rho$ of the lane 12 is determined by the imaging processing block 172, and is sent to a steering angle calculation block 210. The steering angle block 210 converts the curvature $\rho$ into a calculated handwheel angle 212 of the handwheel 34 (shown in FIG. 2). Specifically, in one embodiment, the calculated handwheel angle 212 is determined by the following equation:

$$\delta_f = L/R + Kus*V^2/(g)*1/R$$

or $$\delta_f = L/R + Kus*a_y$$

where $\delta_f$ is the calculated handwheel angle, L is the wheelbase of the vehicle 10, R is the turn radius, Kus is an understeer coefficient, V is the forward vehicle velocity, $a_y$ is lateral acceleration, and g is the acceleration due to gravity. The turn radius R is measured from the camera and processor 162 (e.g., where R=1/$\rho$).

The calculated handwheel angle 212 is sent to junction 214, which compares a measured handwheel angle that is measured by the steering angle sensor 56 (shown in FIG. 2) with the calculated handwheel angle to determine to determine a curvature error $\epsilon_\rho$. The curvature error $\epsilon_\rho$ is sent to proportional gain module 176. In the embodiment as shown in FIG. 4, the proportional gain $K_P'$ is based on the lateral position error $\epsilon_A$ as well as the curvature error $\epsilon_\rho$.

In one embodiment, the derivative gain value $K_D$ (shown in block 192) and the lateral position $\dot{\Delta}$ (shown in block 178) are included (however, in various embodiments the blocks 178 and 192 may be omitted as well). The product of the derivative gain value $K_D$ and the lateral position $\dot{\Delta}$ is sent to a junction 190. The product of the derivative gain value $K_D$ and the lateral position $\dot{\Delta}$ is subtracted from the proportional gain $K_P$ to determine a value 192. The value 192 is multiplied by the lateral position gain $G_{cA}$, at block 94. The product of the lateral position gain $G_{cA}$, and the value 192 are sent to the junction 188, which provides the torque assist command $T'_{assist}$. In one embodiment, the steering torque generated by the algorithm as discussed in FIG. 4 may require a sign change, as packaging requirements for the steering system 30 cause positive torque to turn left or right. Some examples of items that may cause the sign change include, for example, knuckle steer arm ahead vs. behind the steer axle, and a pinion on steering rack (either above or below the rack).

The curvature error $\epsilon_\rho$ is sent to a block 216, which multiplies the curvature error $\epsilon_\rho$ with a closed loop gain $G_{c\rho}$. The closed loop gain $G_{c\rho}$ operates on a closed loop portion of the block diagram shown in FIG. 4 (e.g., the closed loop portion is defined by the junction 214 and the block 210). The closed loop gain $G_{c\rho}$ may also be scheduled based on the lateral position error $\epsilon_A$. The product of the closed loop gain $G_{c\rho}$, the curvature error $\epsilon_\rho$, and the lateral position error $\epsilon_A$ are sent to the junction 188, which determines the torque assist command $T'_{assist}$. $G_{c\rho}$ may also include a frequency based compensation to insure stability.

Some other steering systems currently available base the proportional gain only on the lateral position error $\epsilon_A$. In contrast, the embodiment as shown in FIG. 4 schedules the proportional gain $K_P$ on the lateral position error $\epsilon_A$ as well as the curvature error $\epsilon_\rho$. This in turn will modify the torque assist command $T'_{assist}$, which results in improved handing when the vehicle 10 is being driven along a curved lane 12 (e.g., the curved lane shown in FIG. 1) if the lane keeping system is operating in autonomous mode.

Figure 5:
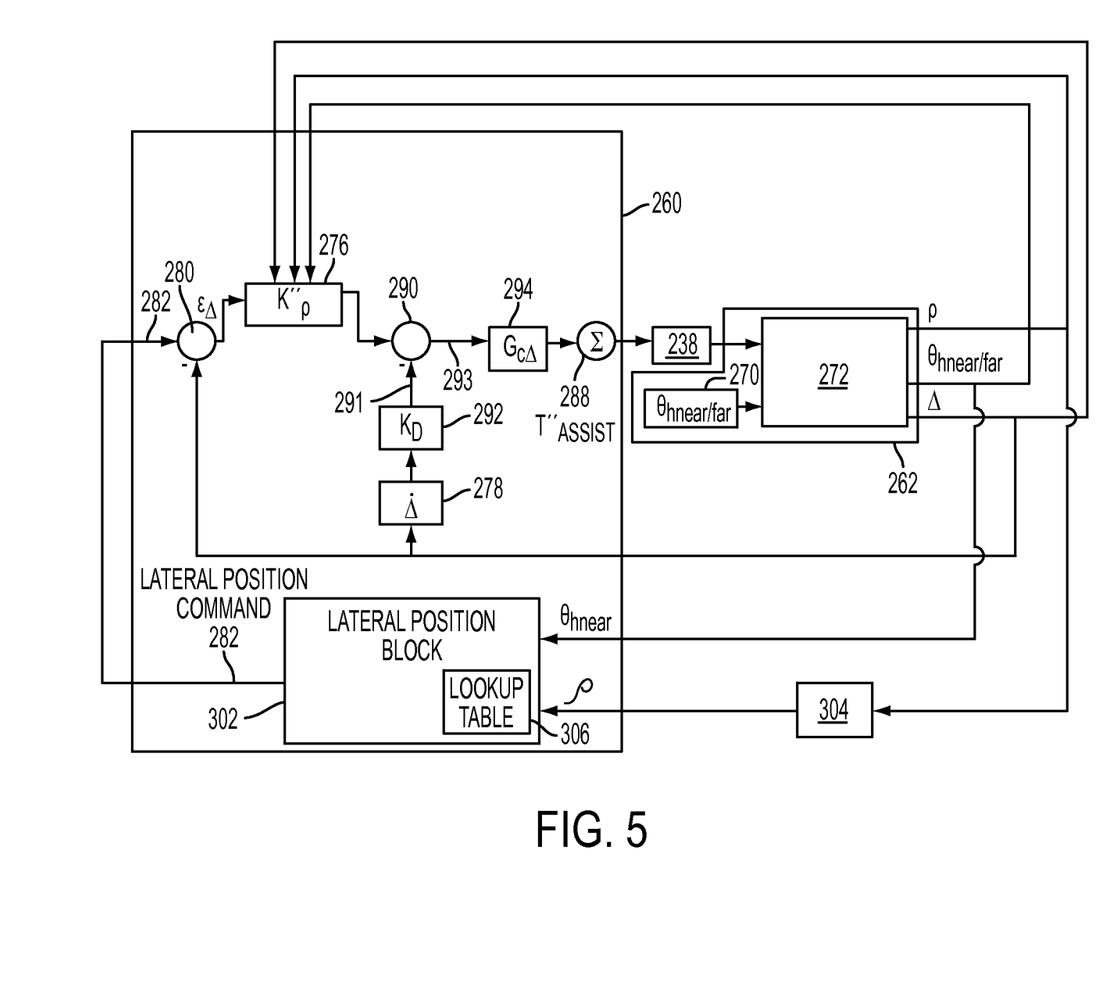
FIG. 5 is another alternative embodiment of the block diagram shown in FIG. 3 illustrating yet another aspect of the invention.

FIG. 5 illustrates another alternative embodiment of an exemplary block diagram of a steering control module 260 used to calculate a torque assist command $T''_{assist}$. In the embodiment as shown, the steering control module 260 includes a lateral position block 302 for determining a lateral position command 282. An imaging processing block 270 includes control logic for determining the near field heading angle $\theta_{hnear}$ and the far field heading angle $\theta_{hfar}$ based on the lane markers 14 (FIG. 1) that are detected by the camera 62 (FIG. 2). The image processing block 270 may send the near field heading angle $\theta_{hnear}$ or the far field heading angle $\theta_{hfar}$ to the image processing block 272. The imaging processing block 270 also sends an indicator that informs the image processing block 272 whether it is the near field heading angle $\theta_{hnear}$ or the far field heading angle $\theta_{hfar}$ that has been sent. The image processing block 272 determines the lateral position $\Delta$ and the curvature $\rho$ based on the lane markers 14 (FIG. 1) detected by the camera 62 (FIG. 2).

The lateral position block 302 may receive as input the near field heading angle $\theta_{hnear}$ and the curvature $\rho$ from the image processing block 272. In the exemplary embodiment as shown, a filter 304 may be provided between the imaging processing block 272 and the lateral position block 302. In one embodiment, the filter 304 may be a low-pass filter having a corner frequency ranging from about 0.2 Hz to about 1.5 Hz.

In one exemplary embodiment, the lateral position block 302 may include control logic for calculating an offset value σ. Referring to FIG. 1, the offset value σ represents a distance from the lane center 20, where a positive offset value σ is to the right of the lane center 20, and a negative offset value σ is to the left of the lane center 20. The offset value σ may be calculated based on the curvature ρ of the lane 12. Specifically, as a radius r of a curve C in the lane 12 decreases in size (e.g., the curvature ρ of the lane 12 becomes more pronounced), the offset value σ increases in value. Referring to both FIGS. 1 and 5, in one embodiment the lateral position block 302 may store a lookup table 306, where various values of the offset value σ are based on corresponding values of the curvature ρ. In another embodiment, the offset value σ may be not be calculated by the lateral position block 302. Instead, the offset value σ is a predetermined value. For example, in one approach, the offset value σ is a predetermined value of about 0.15 meters.

The lateral position block 302 includes control logic for determining a value of the lateral position command 282 based on the near field heading angle $\theta_{hnear}$ and the curvature ρ. Specifically, in one embodiment, the value of the lateral position command 282 may be calculated based on the sign of the near field heading angle $\theta_{hnear}$ and the sign of the curvature ρ. Referring to FIG. 1, the sign of the curvature ρ is positive if the curvature ρ is oriented to the right side of the lane 12 and negative if the curvature ρ is oriented to the left side of the lane 14. The sign of the near field heading angle $\theta_{hnear}$ is positive if the vehicle centerline 22 is positioned to the right of the lane center 20, and negative if the vehicle centerline 22 is positioned to the left of the lane center 20. Table 2 illustrates one example of how the lateral position command 282 may be determined based on the near field heading angle $\theta_{hnear}$ and the curvature ρ:

TABLE 2

| Sign of curvature ρ | Sign of near field heading angle $\theta_{hnear}$ | Value of lateral position command 282 |
|---|---|---|
| + | − | +σ |
| − | + | −σ |
| + | + | 0 |
| − | − | 0 |

For example, Table 2 illustrates that if the sign of the curvature ρ and the sign of the near field heading angle $\theta_{hnear}$ are different from one another, then the value of the lateral position command 282 is set to either a positive or negative value of the offset value σ. If the sign of the curvature ρ and the sign of the near field heading angle $\theta_{hnear}$ are the same as each other, then the value of the lateral position command 282 is set to zero (which represents the lane center 20 shown in FIG. 1).

Referring to FIG. 5, a junction 280 receives as input lateral position command 282 from the lateral position block 302 and the lateral position Δ as calculated by the image processing block 272. The junction 280 determines the difference between the lateral position command 282 and the lateral position Δ to determine a lateral position error $\epsilon''_\Delta$. The lateral position error $\epsilon''_\Delta$ is sent to a proportional gain module 276 to calculate a proportional gain $K''_P$. The proportional gain $K''_P$ is scheduled as a function of the lateral position error $\epsilon''_\Delta$. In one approach, the proportional gain $K''_P$ may also be scheduled as a function of the lateral position error $\epsilon''_\Delta$ in addition to at least one of the near field heading angle $\theta_{hnear}$, the far field heading angle $\theta_{hfar}$, the curvature ρ, and the lateral position Δ.

Similar to the embodiment as described in FIG. 3, the proportional gain $K''_P$ is sent to a junction 290. Junction 290 is also in communication with a derivative gain block 292. In one embodiment, the lateral position Δ as calculated by the image processing block 272 is sent to the lateral position derivative block 278. The lateral position derivative block 278 determines the derivative of the lateral position (e.g., the lateral velocity), which is denoted as $\dot{\Delta}$. The derivative of the lateral position $\dot{\Delta}$ may be sent though a low-pass filter (not illustrated), and to the derivative gain block 292, where the derivative gain value $K_D$ is multiplied by the derivative of the lateral position $\dot{\Delta}$ to determines a product 291. The product 291 is sent to the junction 290, and is subtracted from the proportional gain $K''_P$ to determine a value 293. The value 293 is multiplied by the lateral position gain $G_{cA}$ at block 294. The lateral position gain $G_{cA}$ is the gain or compensation to insure stability that operates on the lateral position error $\epsilon''_\Delta$, the lateral position derivative block 278, and the derivative gain block 292. The product of the lateral position gain $G_{cA}$ and the value 293 are sent to a junction 288, which produces the torque assist command $T''_{assist}$.

Referring generally to FIGS. 1-2 and 5, as the vehicle 10 is driven along the curve C in the lane 12, the torque assist command $T''_{assist}$ needs to increase in magnitude in order to maintain the current position of the vehicle 10 within the lane 12. The lateral position command 282 provides an approach to maintain the current position of the vehicle 10 within the lane 12 along the curve C as the lane keeping system operates in autonomous mode. Specifically, the amount of assist torque (the torque assist command $T''_{assist}$) generated by the lane keeping system is increased if the lateral position command 282 is set to the offset value σ when compared to the lateral position command 282 being set to zero.

FIGS. 3-5 illustrate various embodiments of steering control module 60, 160, and 260 in separate illustrations. In one approach, any one of the embodiments as shown in FIG. 3-5 may be selected to control the steering system 30. In another approach, the embodiments as shown in FIGS. 3-5 may be combined together in any possible combination to control the steering system 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering system providing an assist torque to a handwheel of a vehicle, the control system comprising:
 a lateral position module that determines a lateral position command based on a curvature of a lane and a near field heading angle;
 a proportional gain module for determining a proportional gain value, wherein the proportional gain value is scheduled as a function of the lateral position error;
 a derivative gain module that determines derivative gain value from a derivative of a lateral position;
 a lateral position gain module that determines a lateral position product as a function of the proportional gain value and the derivative gain value;
 a torque command module that determines and applies the torque assist to the steering system based on the lateral position command, the lateral position product, and the proportional gain value.

2. The steering system as recited in claim 1, comprising a lane keeping system that calculates the curvature and the near field heading based on a plurality of lane markers of the lane.

3. The steering system as recited in claim 2, wherein the lane keeping system includes a camera and a processor, wherein the camera detects the presence of the lane markers and the processor includes control logic for determining the curvature and the near field heading angle.

4. The steering system as recited in claim 1, wherein the lateral position command is further based on a sign of the curvature and a sign of the near field heading angle.

5. The steering system as recited in claim 4, wherein the lateral position command is set to zero if the sign of the curvature and the sign of the near field heading angle are equal to one another.

6. The steering system as recited in claim 4, wherein the lateral position command is set to an offset value if the sign of the curvature and the sign of the near field heading angle are different from one another.

7. The steering system as recited in claim 6, wherein the offset value represents a distance from a center of the lane.

8. The steering system as recited in claim 6, wherein the offset value is calculated based on the curvature of the lane.

9. The steering system as recited in claim 6, wherein the offset value is a predetermined value.

10. The steering system as recited in claim 1, further comprising a lateral position error block that determines a lateral position error based on the lateral position command and a lateral position of the vehicle.

11. The steering system as recited in claim 1, wherein the proportional gain value is scheduled as a function of at least one of the following: the near field heading angle, a far field heading angle, the curvature, and the lateral position of the vehicle.

12. A method of determining an assist torque to a handwheel, comprising:
  receiving a curvature of a lane and a near field heading angle by a lateral position module;
  determining a lateral position command based on the curvature and the near field heading angle by the lateral position module;
  determining a proportional gain value, wherein the proportional gain value is scheduled as a function of the lateral position error; and
  determining a derivative gain value from a derivative of a lateral position;
  determining a lateral position product as a function of the proportional gain value and the derivative gain value;
  determining the torque assist based on the lateral position command, lateral position product, and the proportional gain value by a torque command module; and
  applying the torque assist to a steering system.

13. The method as recited in claim 12, comprising a lane keeping system that calculates the curvature and the near field heading based on a plurality of lane markers of the lane.

14. The method as recited in claim 13, wherein the lane keeping system includes a camera and a processor, wherein the camera detects the presence of the lane markers and the processor includes control logic for determining the curvature and the near field heading angle.

15. The method as recited in claim 12, further comprising basing the lateral position command on a sign of the curvature and a sign of the near field heading angle.

16. The method as recited in claim 15, further comprising setting the lateral position command to zero if the sign of the curvature and the sign of the near field heading angle are equal to one another.

17. The method as recited in claim 15, further comprising setting the lateral position command to an offset value if the sign of the curvature and the sign of the near field heading angle are different from one another.

18. The method as recited in claim 17, wherein the offset value represents a distance from a center of the lane.

19. The method as recited in claim 17, wherein the offset value is calculated based on the curvature of the lane.

* * * * *